United States Patent [19]
Meyer et al.

[11] 3,931,357
[45] Jan. 6, 1976

[54] SEPARATE STREAMS WITH DIFFERENT CATALYST PRIOR TO COMBINATION

[75] Inventors: Klaus Meyer; Roland Streck; Heinrich Weber, all of Marl, Germany

[73] Assignee: Chemische Werke Huls Aktiengesellschaft, Marl, Germany

[22] Filed: Aug. 28, 1973

[21] Appl. No.: 392,238

[30] Foreign Application Priority Data
Aug. 31, 1972 Germany............................ 2242794

[52] U.S. Cl. ............ 260/889; 260/42.44; 260/93.1; 260/878 R; 260/878 B; 260/879; 260/897 A
[51] Int. Cl.².................... C08L 9/00; C08L 23/16
[58] Field of Search.... 260/879, 889, 878 R, 878 B, 260/897 A

[56] References Cited
UNITED STATES PATENTS
3,692,872   9/1972   Calderon et al. .................. 260/878

Primary Examiner—Murray Tillman
Assistant Examiner—J. Ziegler
Attorney, Agent, or Firm—Millen, Raptes & White

[57] ABSTRACT

A process for the modification of unsaturated polyolefin rubbers by reaction with other polymers amenable to the metathesis reaction, in the liquid phase, preferably in solution, in the presence of a metathesis catalyst system comprising (a) a soluble compound of a metal of the Subgroups V through VII of the periodic table, and (b) a soluble alkyl or hydride of a metal of Main groups I through III of the periodic table, as well as optionally activators, characterized by the metallic components of the catalyst system each being dispersed, preferably dissolved, separately in partial streams wherein the reaction components are contained, and these partial streams are intermixed intensively.

18 Claims, 1 Drawing Figure

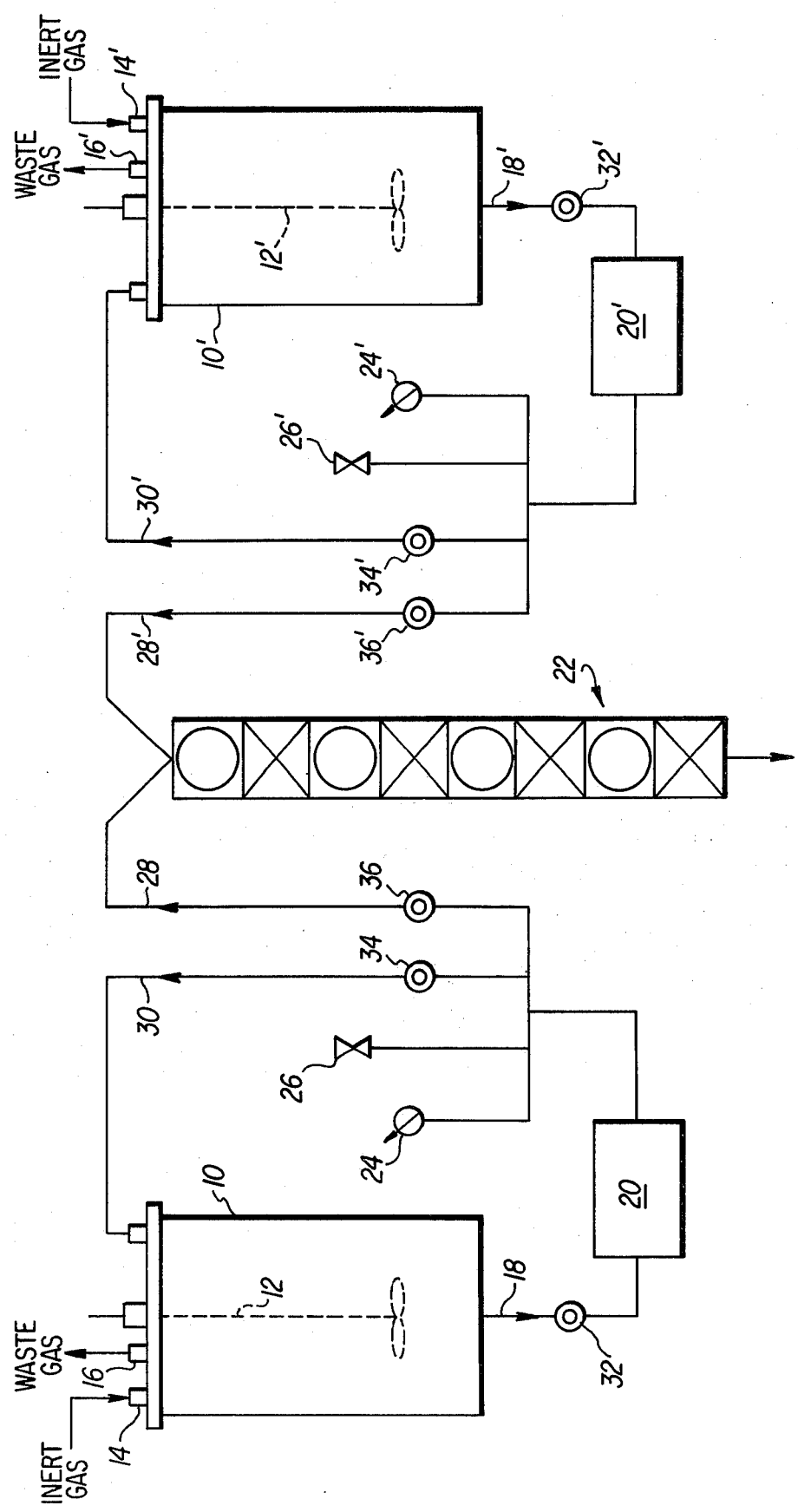

SEPARATE STREAMS WITH DIFFERENT CATALYST PRIOR TO COMBINATION

BACKGROUND OF THE INVENTION

This invention relates to a process for the modification of unsaturated polyolefin rubbers by grafting with other polymers lending themselves to the metathesis reaction, in the liquid phase, preferably in solution, in the presence of a Ziegler-Natta catalyst system comprising (a) a soluble compound of a metal of Subgroups V through VII of the periodic table, and (b) a soluble alkyl or hydride of a metal of Main groups I through III of the periodic table, and optionally catalyst activators, as well as to an apparatus for conducting this process.

As is known, the aforementioned mixed catalysts are capable of polymerizing cyclic olefins having at least one unsubstituted ring double bond, with ring opening (German Published Application No. 1,299,868; and German Unexamined Published Application No. 1,570,940). Such mixed catalysts can effect the disproportionation of open-chain olefins (German Unexamined Published Application No. 1,618,466).

The same catalysts which promote the ring-opening polymerization of cycloolefins are also known to be effective in the olefin metathesis reactions wherein acyclic internal olefins undergo a structural rearrangement, e.g., $2\ R_1-CH=CH-R_2 \longrightarrow R_1\ CH=CHR_1, + R_2CH=CHR_2$ as described, inter alia, by Calderon et al., Tetrahedron Letters 1967; 3327, J. Am. Chem. Soc. 90; 4132 (1968) and in C & E News 45 (41); 51 ff. (1969).

It is also known from German Pat. No. 1,929,140 and German Unexamined Published Applications 2,058,183 and 2,016,471 to use these mixed catalysts in producing copolymers from polyolefinically unsaturated hydrocarbon polymers and either cyclic or acyclic olefinically unsaturated hydrocarbon monomers.

Furthermore, it is known from German Unexamined Published Application No. 1,954,092 to produce graft polymers with the aid of these mixed catalysts by reacting cyclopentene with polybutadienes of various microstructures or with butadiene-styrene block polymers.

Finally, German Unexamined Published Application No. 2,058,198 describes reactions using these mixed catalysts of cycloolefins or polyalkenamers with polyolefinically unsaturated hydrocarbon polymers, inter alia also of EPDM rubber with 1,4-polybutadiene.

Such grafting of longer or shorter unsaturated polydiene side chains onto an EPDM rubber backbone is a useful procedure for solving many of the problems caused by the ternary component, i.e., the diene. The presence of a ternary or diene monomer is required in preparing ethylene-propylene copolymers suitable for elastomer use to give curing rates comparable to those of SBR. A variety of such diene monomers are used for this purpose, principally ethylidene norbornene and 1,4-hexadiene. While EPDM elastomers have many desirable properties, the high cost of the ternary monomer has greatly limited their present potential fields of application. The ternary component must meet several practical requirements which can be fulfilled simultaneously only with great difficulties. Principally, the ternary component should not be impracticably expensive, must copolymerize well with ethylene and propylene, and must impart to the terpolymer the ability to rapidly vulcanize to shaped articles having satisfactory properties suitable for the intended end use in practical applications.

In practice, one is forced to compromise the above criteria in selecting the ternary component. For example, inexpensive dicyclopentadiene can be satisfactorily polymerized, but yields terpolymers which are only gradually vulcanized. On the other hand, when using the likewise inexpensive cis,cis-1,5-cyclooctadiene, rapidly vulcanizing terpolymers are produced, but the ternary monomer must be used in large excess due to its poor ability to copolymerize, and the large unreacted proportion must then be recovered and processed from the polymerization system. 5-Ethylidenenorbornene has favorable characteristics with regard to both copolymerization and vulcanization, but is presently available only at a relatively high price.

A substantial advance in the art would be achieved by making it possible to employ an inexpensive, readily polymerizable ternary comonomer, the remaining double bond of which would be easily vulcanizable. A substantial improvement in the previously inadequate covulcanizability of EPDM rubbers with conventional polydiene rubbers would result from a successful grafting of more strongly unsaturated diene rubber chains onto EPDM rubbers. This property plays an important part in such fields of use where the excellent ozone resistance of the EPDM rubbers is exploited in order to protect polydiene rubbers to be joined therewith from disadvantageous atmospheric influences, e.g., in sidewalls for automobile tires and cover strips therefor.

However, the direct joining of shaped objects made of EPDM rubbers with shaped objects made of polydiene rubbers fails due to both the deficient building tack of the former and the mutual physical incompatability of the two compositions. When attempting to improve adhesion by the physical admixture of polydiene rubber with the EPDM mass, the physical incompatibility of the two compositions prevents the formation of genuine homogeneous mixtures. Furthermore, the great difference in the double bond content of the two types of rubber has the effect in conventional sulfur vulcanization, that the EPDM portion of the mixture is normally undervulcanized (i.e., has too low a crosslinking density) if the polydiene proportion of the mixture is in the correct vulcanization condition, whereas the polydiene portion of the mixture is overvulcanized if the EPDM proportion is in the correct vulcanization condition. Such rubber mixtures do not yield the arithmetic mean of the practical-use properties of the individual components after vulcanization, but rather exhibit pronounced minima.

A detailed discussion of these problems is set forth in the literature article by G. Kerrutt, H. Blümel, and H. Weber entitled "Natural and Synthetic Rubber" in Plastics 22: 413–418 (1969). It can be seen therefrom, inter alia, that the mechanical strength of such compositions has a minimally tolerable value only at a ratio of about 75 parts by weight of polydiene rubber to 25 parts by weight of EPDM rubber. However, this proportion of EPDM rubber is too low to still impart the desired high ozone resistance to the mixture.

Accordingly, there is an urgent technical need for an unsaturated polyolefin rubber which is physically compatible with polydiene rubbers and which can be well covulcanized therewith. In such a case, the practical-use properties of the vulcanized mixtures would not show any pronounced minima, but would follow the law of mixtures in the first approximation, i.e., the nearly ideal addition of the properties of several components in a mixture.

During the linking between different types of unsaturated polymers by so-called "cross methathesis" reactions, side reactions occur which strongly reduce the utility of the copolymers so obtained. For example, EPDM rubber tends strongly toward gelling in the presence of the above-defined catalysts; German Unexamined Published Application No. 2,058,198 describes, in Example 2, the reaction product obtained from the cross metathesis of EPDM and 1,4-polybutadiene as a "flabby gel" which must first be rendered soluble again by mechanical breakdown, e.g., grinding or pulverizing. An additional disadvantage is that 1,4-polybutadiene suffers strong degradation in the presence of these catalysts as can be seen from the examples of German Unexamined Published Application No. 2,016,840. Thus, in the final analysis, copolymers having a property spectrum suitable for such practical uses cannot be obtained in accordance with the indicated present state of the art.

These undesired side reactions occur to an increasing extent with lengthening reaction periods, so that they can only be prevented by correspondingly short reaction times, if no further measures are taken. Due to the viscosity of the polymer solutions and the agitating and mixing problems connected therewith, it is difficult to realize such correspondingly brief reaction times, even on an experimental scale.

OBJECTS OF THE INVENTION

Accordingly, it is a general object of the present invention to provide a process for simultaneously covulcanizing a rubber composition comprising both an unsaturated polyolefin rubber and a polydiene or polyalkenamer rubber.

Another object of this invention is to provide a covulcanized rubber composition comprising both an unsaturated polyolefin rubber and a polydiene or polyalkenamer rubber wherein each rubber component is correctly vulcanized.

A further object of this invention is to provide a process for chemically joining shaped objects of an unsaturated polyolefin rubber with shaped objects of polydiene rubber by cross metathesis wherein undesirable side reactions are greatly reduced or eliminated.

An additional object of this invention is to provide unsaturated polyolefin rubbers having double bonds which are not themselves readily vulcanizable but which are latently so.

Yet another object of this invention is to provide an unsaturated polyolefin rubber having improved covulcanizability and physical compatibility with polydiene and polyalkenamer rubbers.

A still further object of this invention is to provide an apparatus suitable for conducting the metathesis reaction between an unsaturated polyolefin rubber and a polydiene or polyalkenamer rubber.

A more particular object of this invention is to provide compositions comprising an EPDM rubber and a polybutadiene or polyalkenamer rubber having the above properties.

Upon further study of the specification and appended claims, further objects and advantages of this invention will become apparent to those skilled in the art.

SUMMARY OF THE INVENTION

Briefly, the above and other objects are attained in one aspect of the present invention by providing a process for grafting a polydiene or a polyalkenamer onto an unsaturated polyolefin rubber backbone, which comprises: (a) dispersing in a first liquid stream a catalytically effective amount of a first organic solvent-soluble Ziegler-Natta catalyst component containing a metal of Subgroups V thru VII of the periodic table; (b) dispersing in a second liquid stream separate from said first stream a catalytically effective amount of a second organic solvent-soluble Ziegler-Natta catalyst componet containing an alkyl or a hydride of a metal from Main groups I thru III of the periodic table; (c) dispersing, separately or as a mixture, into one or both of said first and second streams or into at least one further liquid stream (i) a polydiene or a polyalkenamer having at least one metathesisable double bond per molecule; and (ii) an unsaturated polyolefin rubber comprising a metathesisable copolymer of two or more α-olefins with an unconjugated diolefin; and (d) intensively intermixing said streams under metathesis reaction conditions to form in situ a catalytic amount of a complete Ziegler-Natta catalyst system and to graft said polydiene or polyalkenamer onto said polyolefin rubber, thereby reducing side reactions between the catalyst components and the polymer components of said streams.

BRIEF DESCRIPTION OF THE DRAWING

The above and other objects will become more fully apparent to those skilled in the art to which this invention pertains from the following Detailed Discussion, taken in conjunction with the annexed drawing, which schematically represents one apparatus suitable and presently preferred for conducting the process of this invention.

DETAILED DISCUSSION

It has now been found that the above and other objects of this invention are surprisingly attained with the aid of inexpensive, readily polymerizable termonomers, the double bonds of which, following polymerization, are not per se easily vulcanizable. In accordance with this invention, it has been found that these double bonds can be rendered easily vulcanizable by a subsequent metathesis reaction which can be effected simultaneously with the grafting of a polydiene or polyalkenamer onto the unsaturated polyolefin rubber backbone.

The present invention provides a process for the modification of unsaturated polyolefin rubbers by reaction with other polymers amenable to the metathesis reaction, in the liquid phase, preferably in solution, in the presence of a catalyst system comprising (a) a soluble compound of a metal of the Subgroups V through VII of the periodic table, and (b) a soluble alkyl or hydride of a metal of Main groups I through III of the periodic table, as well as optionally activators. The process is characterized in that the metallic components of the catalyst system are each dispersed, preferably dissolved, separately in partial streams wherein the reaction components are contained, and these partial streams are intermixed intensively.

Suitable unsaturated polyolefin rubbers to be modified are copolymers of two or more α-olefins, one of which is preferably ethylene, with one or more unconjugated diolefins or polyunsaturated olefins, produced with the aid of so-called Ziegler-Natta catalysts. Generally, the copolymerized α-olefins are those of 3-10, preferably 3-6 carbon atoms. Suitable such α-olefins include but are not limited to butene-1, 4-methyl-1-pentene, 1-pentene, 1-octene, 5-methyl-1-nonene, 1-decene, and 5,6,6-trimethyl-1-heptene. Especially preferred is propylene.

Suitable unconjugated diolefins or multiple olefins are straight-chain or cyclic hyrocarbons, which include but are not limited to:

a. unconjugated aliphatic dienes and trienes, e.g., 1,4-pentadiene, 1,4-hexadiene, 1,5-hexadiene, n-1,4,9-decatriene, etc.;

b. unconjugated monocyclic dienes, e.g. cis,cis-1,5-cyclooctadiene, 3-viny-1-cyclooctene, etc.;

c. unconjugated bi- and polycyclic dienes and polyenes, e.g., dicyclopentadiene, polycyclopentenyls, norbornadiene, cyclopentenylmethylnorbornene, butenylnorbornene, vinylnorbornene, tricyclotridecatriene (Diels-Alder adduct from 1,5-cyclooctadiene, etc.

Preferably usable are those EPDM rubbers (i.e., elastomeric copolymers of ethylene, propylene, and one or more unconjugated diolefins or multiple olefins) wherein the double bonds remaining in the polymer from the polymerized ternary monomer or diene component are at least partially unsubstituted and contained either in an open chain with 2-20 carbon atoms, in a ring with 4, 5, 7, or more carbon atoms, or in a stressed bicyclic ring system which comprises an unsaturated six carbon atom ring.

Unsuitable for the process of this invention are those EPDM rubbers, the double bonds of which are substituted or are in an unstressed six-membered ring, e.g., those wherein the diene component comprises exclusively ethylidenenorbornene, cyclohexenylnorbornene, isopropylidenenorbornene, vinylmethylene hydrindene, 4-methyl-1,4-hexadiene, 4-vinyl-1-cyclohexene, or other compounds of a similar structure.

The ethylene/propylene proportion of the EPDM rubbers is uncritical for their suitability as a basic graft component, as long as rubber is sufficiently soluble in the chosen polymerization reaction media. Ordinarily the weight ratio of ethylene to propylene in the copolymer is about 20 : 80 – 80 : 20, preferably 35 : 65 – 65 : 35. The diene content of the EPDM copolymers can fluctuate between 3 and 20% by weight of the total copolymer.

Especially preferred in the process of this invention are EPDM rubbers containing dicyclopentadiene and/or 1,4-hexadiene as the ternary component.

Polymers accessible to the metathesis reaction which can be used in this invention include but are not limited to homo and/or copolymers of butadiene, e.g., cis-1,4-polybutadiene, styrene-butadiene copolymers, and copolymers of butadiene with other mono- and/or diolefins, e.g., ethylene, propylene, butene-1, styrene, isoprene, etc., obtained by various known polymerization methods.

In this connection, more than 80%, preferably more than 90% of the butadiene in the homopolymers and/or of the butadiene proportion in the copolymers must be present as 1,4-linkages. If the butadiene proportion in the aforementioned homo- and/or copolymers of butadiene in the form of 1,2- or vinyl linkages amounts to or exceeds 20%, undesired cross-linking reactions occur during the reaction. Preferably, a polybutadiene is employed in the process of this invention wherein more than 75%, especially more than 90%, of the double bonds are present as cis-1,4. These polybutadienes are produced in a known manner, e.g., with Ziegler-Natta catalysts from alkylaluminum halides in combination with cobalt compounds and/or nickel compounds. Catalysts suitable for the production of low-molecular weight liquid 1,4-cis-polybutadienes include but are not limited to catalysts of alkylaluminum sesquichlorides and nickel compounds soluble in the diluent.

Instead of the polybutadiene, it is also possible to use, for the grafting of the EPDM rubber, polymers obtained by the ring-opening polymerization of cycloolefins with 4, 5, 7, or more ring carbon atoms, i.e., the so-called polyalkenamers. Suitable such polyalkenamers include but are not limited to polybutenamer (from cyclobutene, 1,5-cyclooctadiene, or 1,4,9-cyclododecatriene), polypentanamer (from cyclooctene), polynonenamer (from cyclononene), polydecenamer (from cyclodecene), polyundecenamer (from cycloundecene), polydodecanamer (from cyclododecene) and polytridecenamer (from cyclotridecene). Preferred polyalkenamers are polypentenamer, polyoctenamer, and polydodecenamer. Polymers of di- and triolefins, e.g., norbornene, dihydrocyclopentadiene, can also be utilized for the process of this invention.

Also usable for the reaction of this invention are partially hydrogenated or otherwise substituted derivatives of the aforementioned polymers, insofar as the substitution is inert, i.e., has not resulted in the introduction of functional groups inactivating the catalyst or otherwise interfering with polymerization. Obviously, copolymers of two or more of the above monomers are likewise suitable for this reaction. The only prerequisite is that at least one double bond per molecule of the higher-unsaturated grafting polymers is unsubstituted, and that this double bond is not present in an unstressed six-membered ring. The molecular weights (arithmetic means) of the higher-unsaturated grafting polymers to be grafted onto a backbone can vary, e.g., between about 300 and 500,000. Molecular weights of between 500 and 300,000 are preferred.

In the process of this invention, the starting components can be reacted with one another in any desired quantitative ratio. In general, mixtures containing 5–98% by weight, preferably 10–90% by weight, of unsaturated polyolefin rubbers are used in the reaction.

The reaction can be conducted in all inert solvents suitable for polymerization with Ziegler-Natta catalysts, i.e., those solvents which do not adversely effect the catalysts or the course of the reaction, e.g., aliphatic, alicyclic, aromatic and halogenated hydrocarbons. Suitable such solvents include but are not limited to one or more of alkanes, e.g. pentane, hexane, heptane, n- and isooctane, isononane (hydrogenated trimeric propene), n-decane, isododecane (hydrogenated tetrameric propene); cycloalkenamers, e.g. cyclopentane, methylcyclopentane, cyclohexane and the substitution products thereof, methylcyclohexane, ethylcyclohexane, isopropylcyclohexane, cyclooctane; naphthalenes, e.g. tetrahydronaphthalene and decahydronaphthalene; hydrogenated terpenes, e.g. pinane and camphane; aromatic hydrocarbons, e.g. benzene, toluene, o-, m-, p-xylene, ethylbenzene, o-, m-, p-diethylbenzene, n-propylbenzene, isopropylbenzene, and other mono- or polyalkylbenzenes; and halogenated alkyl or aryl hydrocarbons, e.g. methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene and 1,2-dichloroethane.

As is known, it is essential that the solvents, by suitable purification, be maximally free of water and other H-acidic compounds, as well as of compounds having electron donor functions (Lewis bases). Except for very small quantities which are optionally added to achieve certain effects, such impurities generally impair the activity of the catalyst.

It is furthermore known that conjugated diolefins, such as butadiene, have a very adverse effect on the catalyst. Therefore, when carrying out the process of this invention, these compounds are extensively removed, e.g., by means of vacuum degasification when the procedure followed does not involve the dissolution of a finished, monomer-free homo- or copolymer of butadiene in a separate step, but rather the direct use of a solution stemming from the production of the copolymer for the manufacture of the grafted products.

The polymers to be reacted also should have, insofar as possible, no conjugated double bonds. Very minor contents are tolerable, equivalent at most to the catalyst concentration on a molar basis. Flawless conductance of the process of this invention presupposes, as in all other reactions in the presence of Ziegler-Natta catalysts, that the reaction take place under maximum exclusion of atmospheric oxygen, i.e., in sealed reactors under a protective fluid atmosphere. In principle, all those gases are suitable as the protective gas which do not inactivate the catalysts, e.g., the noble gases, paraffinic hydrocarbons and cycloparaffinic hydrocarbons having 1-4 carbon atoms and the chlorinated and fluorinated derivatives thereof, insofar as they are in the gaseous phase under the polymerization conditions employed. In practice, extremely pure nitrogen or argon will be utilized almost exclusively.

In accordance with the invention, the metal-containing components of the catalyst system are dispersed, preferably dissolved prior to the beginning of the reaction respectively separately in partial streams, and these partial streams are intensively intermixed prior to the metathesis reaction proper. In this process, various methods can be followed. Thus, it is possible to dissolve each metal-containing component of the catalyst system separately in partial streams of one and the same mixture of the polymer solutions. This mode of operation is advantageous especially if the quantities of the polymers to be reacted differ greatly, since the mixture ratio can in this way be more readily maintained at a constant value. It is possible to dissolve one of the metallic components of the catalyst system in the solution of the rubber and the other metallic component of the catalyst system in the solution of the polymer amenable to the metathesis reaction. It is also feasible to dissolve one of the metallic components of the catalyst system in the solution of a polymer and the other metallic component of the catalyst system in the mixture of the polymer solutions. Finally, one of the metallic components of the catalyst system can be dissolved in the mixture of the polymer solutions and the other metal-containing component of the catalyst system dissolved in the pure solvent and/or solvent mixture.

In any event, care must be taken that the metal-containing components of the catalyst system are intimately mixed with the remaining reactants before being subjected to the reaction proper. Only in this way is it possible to avoid maximally high local catalyst concentrations and thereby achieve the objects of the present invention.

A special embodiment of the invention is the continuous conductance of the reaction with short reaction times, e.g., on the order of 0.1 second to 30 minutes, preferably 0.5 second to 10 minutes.

An intensive intermixing of the partial streams is necessary for the successful accomplishment of the reaction according to the present invention. This can be achieved, for example, by allowing the reaction to proceed in a flow pipe containing mechanically movable or also fixed installations promoting the mixing action, thus representing a so-called "in-line" mixer. Especially advantageous is the use of a "static mixer," commercially available, described in U.S. Pat. No. 3,286,992, the contents of which are incorporated by reference herein. However, other thorough mixing devices suitable for high-viscosity fluids which can be operated in a continuous manner are also basically usable.

In this connection, it is not absolutely necessary to conduct the reaction of this invention in a single passage through the mixing device. Rather, the given reaction time can be extended, either by recycling a portion of the reaction mixture or by effecting a subsequent agitation in a normal agitator-equipped vessel, up to a desired time value. This value depends on various parameters of the reaction system, examples being the type and concentration of the catalyst and of the polymers to be reacted, the temperature, and the desired degree of grafting. Accordingly, the data given herein regarding reaction times are to be considered merely as typical, rather than limiting. The optimum reaction time can be readily determined by those skilled in the art for each particular case.

The metathesis reaction in the process of the present invention is conducted at temperatures of between −50° C. and +80° C. The reaction temperature is limited in the upper direction by the thermal stability of the catalyst and in the lower direction by an impractically reduced reaction velocity. Advantageously, temperatures of between −30° and +50° C. are utilized, but preferably a range of between 0° and +30° C. is employed, which can be easily realized.

As is known, metathetical catalysts are mixed catalysts containing compounds of metals of the Subgroups V through VII of the periodic table, predominantly those of niobium, tantalum, molybdenum, tungsten, and rhenium, as well as compounds of metals of Main groups I through III of the periodic table, preferably their alkyls or hydrides, optionally with additional ligands, e.g., halogen, alkoxyl, or carboxylate, or, in place thereof, Lewis acids. Reference is made to the Periodic Table published in H. Remy, "Lehrbuch der Anorg. Chemie," Band I, Anhang (1965) and to the discussion of metathesis catalysts in William B. Hughes, Organometal. Chem. Syn. 1 (1972) 341 – 74 the contents of which are incorporated by reference herein. The metathetical catalysts can conventionally contain one or more activating additives, e.g., alcohols, epoxides, hydroperoxides, vinyl and allyl ethers and esters, vinyl halides and aromatic nitro compounds.

The customary fillers can be incorporated into the products produced according to this invention, and the products of this invention can be admixed to conventional rubber mixtures, both by means of processing customarily used in the rubber industry. Normally, the mixing step can be executed without a separate operating step, simultaneously with the incorporation of fillers during the course of the production of the basic mixture, by means of a rolling mill or an internal mixer. In this connection, it is possible to employ without exception inert fillers, e.g., asbestos, dolomite, aluminum oxide or silicate, barium sulfate, calcium silicate or carbonate, magnesium oxide or silicate, alumina, titanium dioxide and clays; active reinforcing agents, such as carbon black; moderately active fillers, e.g., finely divided silicas; and plasticizers. In order to prepare special vulcanized products, it is furthermore possible to utilize the conventional auxiliary agents, such as antiaging substances and cross-linking agents.

The unsaturated polyolefin rubbers which, produced in accordance with the process of this invention, are practically gel-free, can be vulcanized by means of conventional methods, wherein rapid vulcanization is attained due to the modification of the polymers. Furthermore, this modification results in a higher compatibility and good covulcanization with polydiene rubbers. Of particular importance is the fact that no special operations are required to effect the cross-linking reaction in presses, autoclaves, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 AND COMPARATIVE EXPERIMENTS A AND B

Referring briefly to the drawing, an apparatus is illustrated for conducting the process of this invention on a laboratory scale. The apparatus comprises two agitator-equipped vessels 10,10' each having a capacity of 3 liters and provided with agitators 12,12' and means for the introduction 14,14' and removal 16,16' of an inert gas (argon); these vessels are connected with the mixing pipe 22 via discharge pipes 18,18' and gear pumps 20,20'. Downstream of the gear pumps, discharge pipes 18 and 18' are branched off-stream to pressure gauges 24,24' and pressure relief safety valves 26,26', and also branched onstream to mixer feed lines 28,28' and recycle lines 30,30' which latter return to the vessels 10,10'. Flow regulating means such as ballcocks 32,32', 34,34' and 36,36' are interposed in the discharge pipes, mixer feed lines and recycle lines respectively to facilitate accurate metering into the mixing pipe of solutions having varied viscosities and pressures. The mixing pipe employed was a "Static Mixer" according to U.S. Pat. No. 3,286,992, having a diameter of 19 mm. and a length of 50 cm., with 21 mixing elements installed therein. The lower end of the mixing pipe terminates in a 4-liter three-necked flask (not shown), the central neck of which is provided with an agitator and the third neck of which carried a dropping funnel in addition to a supply inlet for the inert gas. In the agitator-equipped vessel 10, 70 g. of cis-1,4-polybutadiene ("BUNA" CB 10), dissolved in 1400 ml. of absolute benzene, was mixed under agitation with 0.879 millimole of tungsten hexachloride and 0.439 millimole of ethanol. In the second agitator-equipped vessel 10', 70 g. of ethylene-propylene-dicyclopentadiene rubber with 44% by weight of propylene units and 7 double bonds per 1000 carbon atoms, likewise dissolved in 1400 ml. of absolute benzene, was combined with 0.439 millimole of ethanol and 8.79 millimoles of ethylaluminum dichloride. Both polymer solutions were then forced through the Static Mixer by means of the gear pumps, which required in total 20 minutes. From this throughflow time and the content of the mixing pipe during operation, an effective residence time of 43 seconds is derived.

Immediately after passage through the mixing pipe, the reaction was interrupted by adding a solution of 5 g. of potassium hydroxide and 2 g. of 2,6-di-tert.-butyl-p-cresol ("IONOL") to the vigorously agitated content of the associated three-necked flask.

The polymer was worked up by stirring the solution into 13 l. of methanol, extracting the thus-precipitated polymer for 2 hours with 4 l. of methanol in order to remove residual catalyst components, and drying in a vacuum drying chamber at 40° C.

In Comparative Experiment A, the two polymer solutions were mixed in the apparatus without adding the catalyst, so that no graft polymerization reaction could take place, thus merely resulting in an intimate mixture of the polymers.

A further batch, Comparative Experiment B, differed from Example 1 insofar as the polymer solutions to which the catalyst components has been added were not passed through the mixing pipe, but rather were pumped directly into a three-necked flask and, after an agitation period of 2 minutes, were inactivated by adding the decomposing solution. A strong increase in viscosity resulting in the formation of a jelly-like mass was observed.

Table 1 indicates the results of these three experiments.

TABLE 1

|  | Example 1 | Comparative Experiment A | Comparative Experiment B |
| --- | --- | --- | --- |
| Isolated polymer (g.) | 129.2 | 132.0 | 137.8 |
| Reduced specific viscosity (dl./g.)* | 2.6 | 2.1 | 1.6 |
| Gel proportion (%)* | 2 | 2 | 40 |

*determined in toluene at 25° C.

The reduced specific viscosity of the starting polymers was 2.7 dl./g. for the cis-1,4-polybutadiene, and 1.7 dl./g. for the EPDM rubber. Both contained less than 2% gel.

It can be seen from Table 1 that conducting the grafting reaction in accordance with the present invention, in contrast to Comparative Experiment B, yields practically gel-free products which hardly differ from the mixture of the two polymers (Comparative Experiment A) with respect to gel content. As contrasted to Comparative Experiment B wherein the soluble proportions have suffered a marked degradation (as can be seen from the reduction in the RSV as compared to the polymer mixture from 2.1 dl./g. to 1.6 dl./g), an equally marked increase in the RSV has taken place, which indicates good success of the grafting reaction, since the molecular weight of the polymer is increased by grafting.

Additional proof for the fact that a polybutadiene-modified EPDM rubber has been produced in Example 1, rather than having a side-by-side existence of the two unreacted components (which could be supposed due to the short reaction time) stems from examination of the vulcanization behavior of the samples. The methodology of such examinations is described in greater detail in the above-mentioned work by G. Kerrutt, H. Blumel, and H, Weber, "Natural and Synthetic Rubber" Plastics 22; 413–418 (1969), the contents of which are incorporated by reference herein. At this point, it need only be noted that the samples were vulcanized with a unit recipe (100 parts by weight of polymer, 5 parts by weight of zinc oxide, 1.5 parts by weight of sulfur, and 1.5 parts by weight of tetramethylthiuram disulfide) at eight different heating times between 5 and 120 minutes at 160° C., and were thereafter subjected to equilibrium swelling in p-xylene (48 hours at 23° C.). This procedure yields three important indications:

1. The reciprocal equilibrium swelling $1/Q$ as a measure of the cross-linking density of the vulcanized product, wherein Q is the weight ratio of the swelling agent absorbed by the polymer to the cross-linked polymer (i.e., to the insoluble proportion of the vulcanized product);
2. the $t_{90}$ value, i.e., the time at which 90% of the maximum cross-linking density has been reached;
3. the proportions of the vulcanized product soluble in the swelling agent, which is a reliable measure for the completeness of the cross-linking reaction.

The product from Comparative Experiment B was not included in these investigations, since a highly gelled polymer is of no interest from the viewpoint of practical use and processing technology.

Table 2 contains the results of these vulcanization studies for the polymer according to Example 1, the polymer mixture according to Comparative Example A, and the pure aforementioned cis-1,4-polybutadiene ("BUNA" CB 10) and EPDM components.

TABLE 2

| Sample | 1/Q | $t_{90}$ (min.) | Soluble Proportions (% by Wt.) |
|---|---|---|---|
| Polymer of Example 1 | 0.22 | <5 | 2.8 |
| Mixture of Comparative Experiment A | 0.18 | <5 | 49 |
| cis-1,4-Polybutadiene | 0.29 | <5 | 1.5 |
| EPDM | 0.36 | 30 | 4 |

It can be seen that the EPDM rubber modified in accordance with the process of this invention is not only practically gel free, as already seen from Table 1, but can also be cross-linked very rapidly to a low solubility vulcanizate. In contrast thereto, one-half of the vulcanized product from Comparative Experiment A is dissolved in the swelling agent, corresponding exactly to the amount of EPDM rubber existing in the mixture, which rubber thus was not at all included in the vulcanization.

EXAMPLE 2

Both storage tanks of the apparatus described in Example 1 were charged with equal parts of a solution of 180 g. of the EPDM rubber described and employed in Example 1 and 36 g. of cis-1,4-polybutadiene ("BUNA" CB 10) in 5.2 l. of absolute benzene. The content of vessel 1 was mixed under agitation with 2.61 millimoles of ethanol and 2.61 millimoles of tungsten hexachloride, and that of vessel 2 with 2.61 millimoles of ethanol and 2.61 millimoles of ethylaluminum dichloride. The solutions were pumped at the same rate through the mixing pipe; the residence time was 1.1 seconds. Thereafter, the mixture was further stirred for 5 minutes in the associated 6-liter agitator-equipped flask, before the catalyst deactivator solution was added. The mixture was then worked up as described in Example 1.

177.5 g. of a colorless copolymer was obtained having an RSV of 1.9 dl./g. (measured in a 0.2% solution in toluene at 25° C.), which was 96% by weight soluble in toluene at 25° C., i.e., contained 4% gel.

The test vulcanization with swelling measurements resulted in a $t_{90}$ value of 10 minutes, a reciprocal swelling of 0.30, and 3.3% by weight soluble vulcanizate.

This example demonstrates the subdivision of a solution containing both polymer components proposed for more extreme quantitative ratios of the two components. Separate mixing of the solution with each catalyst component and the subsequent combination of the two solutions in the mixing pipe likewise result in products having excellent vulcanization behavior.

EXAMPLE 3

In the manner described in Example 2, 170 g. of the EPDM rubber described in Example 1 and used in Examples 1 and 2 and 8.5 g. of polybutadiene oil with an arithmetic mean molecular weight of 1600 ("Polyoel" Huels 110; double bond distribution: about 80% cis-, 19% trans-, and 1% vinyl-double bonds) as a solution in 3.5 l. of absolute benzene was distributed between the two storage tanks; mixed with 2.23 millimoles of ethanol and 2.23 millimoles of tungsten hexachloride, and 2.23 millimoles of ethanol and 22.3 millimoles of ethylaluminum dichloride, respectively; and pumped at a residence time of 2.6 seconds through the mixing pipe, after which a post reaction time of 30 minutes followed.

After the working-up operation, 165 g. of a colorless polymer was isolated having an RSV of 2.5 dl./g. and a gel content of 3%. The $t_{90}$ value of the product amounted to 16 minutes during the homovulcanization; the reciprocal equilibrium swelling was 0.37.

A blend of this product and equal parts by weight of pure cis-1,4-polybutadiene ("BUNA" CB 10) yielded, in the vulcanization and swelling tests, a $t_{90}$ value of 2 minutes, a reciprocal equilibrium swelling of 0.23 with only 8% by weight of proportions soluble in p-xylene. These amounted, as indicated in Table 1, to 49% by weight in case of a blend of polybutadiene and unmodified EPDM.

Therefore, it can be seen that modification of EPDM rubber according to the present invention leads to a product having a very good covulcanization behavior with respect to a polydiene rubber.

EXAMPLE 4

120 g. of the EPDM rubber described in Example 1 and used in Examples 1–3 and 120 g. of cis-1,4-polybutadiene ("BUNA" CB 10) were dissolved in 4.8 l. of absolute benzene; distributed in equal portions between the two storage tanks; mixed in the latter with 0.25 mmole of ethanol and 0.5 mmole of tungsten hexachloride, or 0.25 mmole of ethanol and 3 mmoles of ethyl-aluminum dichloride, respectively; and pumped through the mixing pipe with a residence time of 2.1 seconds. As in Example 1, the reaction was then immediately stopped by adding the stabilizer-containing catalyst decomposition solution. After the working-up step, 255 g. of a copolymer was obtained having a reduced specific viscosity of 2.3 dl./g., which was 93% by weight soluble in toluene at 25° C.

Vulcanization yielded at $t_{90}$ value of less than 5 minutes, a reciprocal equilibrium swelling of 0.24, and 3.7% by weight of the components soluble in p-xylene.

It can be seen from this example that the residence time of 2.1 seconds, which is extremely low for polymer reactions, results in products which can be cross-linked rapidly and completely.

EXAMPLE 5

286 g. of the EPDM rubber described in Example 1 and used in Examples 1–4 and 14.3 g. of a polyoctenamer having an RSV of 0.48 dl./g. and 62% trans-, as well as 38% cis-double bonds, were dissolved in 5.7 l. of absolute benzene; respectively one-half of this mixture was introduced into each of the two storage tanks and mixed therein with 0.3 mmole of ethanol and 0.6 mmole of tungsten hexachloride, and with 0.3 mmole of ethanol and 3.6 mmoles of ethylaluminum dichloride, respectively. The modification reaction was conducted as in Example 3 with a residence time of 1 second in the static mixer and a post reaction time of 30 minutes.

After the working-up operation, 280 g. of a graft product was obtained having an RSV of 1.9 dl./g., of which 93% by weight was soluble in toluene at 25° C. The homovulcanization thereof results in a $t_{90}$ value of 17 minutes with a reciprocal equilibrium swelling of 0.39 and 4% by weight of components soluble in p-xylene at 25° C. During covulcanization of a blend of equal parts by weight of this product with the cis-1,4-polybutadiene utilized in Examples 1 and 2, a $t_{90}$ value of 4 minutes was obtained, with a reciprocal equilibrium swelling of 0.25, and with 5% by weight of components soluble in p-xylene at 25° C., representing very satisfactory covulcanization characteristics.

EXAMPLE 6 AND COMPARATIVE EXPERIMENTS C AND D

Both storage tanks of the apparatus set forth in Example 1 were charged with equal parts of a solution of 100 g. of an ethylene-propylene-trans-1,4-hexadiene rubber with 47% by weight of propylene units, 6.5 double bonds per 1000 carbon atoms, and a Mooney viscosity of $ML_4 = 84$, and 100 g. of cis-1,4-polybutadiene ("BUNA" CB 10) in 4 l. of absolute benzene. The contents of tank 10 were mixed under agitation with 1.6 mmoles of ethanol and 1.6 mmoles of tungsten hexachloride and the contents of tank 10' with 1.6 mmoles of ethanol and 6.4 mmoles of ethylaluminum dichloride. The solutions were pumped through the mixing pipe at the same rate, the residence time being 2 seconds. Thereafter, the mixture was further agitated in the associated 6-liter agitator flask for 10 minutes, before the catalyst decomposition solution was added thereto. The reaction mixture was subsequently worked up as described in Example 1.

In Comparative Experiment C, the same two polymer solutions were mixed in the apparatus without the addition of a catalyst, so that no graft reaction could take place, the product being merely an intimate mixture of the polymers.

A third batch, Comparative Experiment D, differed from Example 6 insofar as the polymer solutions provided with the catalyst components were not conducted through the mixing pipe, but rather were pumped directly into a three-necked flask and were inactivated after 2 minutes of agitation by adding the catalyst decomposition solution. In this process, a strong increase in viscosity was observed, forming a jelly-like mass. Table 3 indicates the results of these experiments.

TABLE 3

| | Example 6 | Comparative Experiment C | D |
|---|---|---|---|
| Isolated polymer (g.) | 180.4 | 186.5 | 185.0 |
| Reduced specific viscosity (dl./g.)* | 2.4 | 2.2 | 1.7 |
| Gel proportion (%)* | 2 | 2 | 47 |

*determined in toluene at 25° C.

The reduced specific viscosity of the starting polymers was 2.7 dl./g. for cis-1,4-polybutadiene and 1.9 dl./g. for the EPDM rubber. Both contained less than 2% gel.

It can be seen from Table 3 that conducting the grafting reaction in accordance with this invention results in practically gel-free products, contrary to Comparative Experiment D, which products hardly differ in this respect from the mixture of the two polymers in Comparative Experiment C. In contrast to Comparative Experiment D, a rise in RSV has likewise taken place herein, which is evidence of a successful grafting reaction.

The data obtained in a test vulcanization with a unit recipe according to Example 1 for the polymer of Example 6, the polymer mixture of Comparative Example C, and the pure components cis-1,4-polybutadiene and EPDM, are compiled in Table 4.

TABLE 4

| Sample | 1/Q | $t_{90}$ (min.) | Soluble Proportions (% by Wt.) |
|---|---|---|---|
| Polymer of Example 6 | 0.25 | <5 | 3.4 |
| Mixture according to Comparative Experiment C | 0.19 | <5 | 47.5 |
| cis-1,4-Polybutadiene | 0.29 | <5 | 1.5 |
| EPDM | 0.38 | 21 | 3.5 |

It will be seen that the EPDM rubber modified according to the process of this invention can be vulcanized very rapidly to yield very minor soluble proportions. In contrast thereto, almost half of the vulcanizate from Comparative Experiment C is dissolved in the swelling agent, corresponding exactly to the quantity of the EPDM rubber present in the mixture.

EXAMPLE 7

In the manner described in Example 2, 200 g. of the EPDM rubber described and employed in Example 6 and 10 g. of the polybutadiene oil described and used in Example 3, each as a solution in 4 l. of absolute benzene, were distributed between the two storage tanks; mixed with 1.25 mmoles of ethanol and 2.5 mmoles of tungsten hexachloride, and 1.25 mmoles of ethanol and 15 mmoles of ethylaluminum dichloride, respectively; and pumped through the mixing pipe with a residence time of 3.5 seconds. There followed a post reaction of 15 minutes. After the mixture was worked up, 185 g. of a colorless polymer was isolated, having an RSV of 2.3 dl./g. and a gel content of 4%. The $t_{90}$ value of the product was 12 minutes in the homovulcanization and the reciprocal equilibrium swelling was 0.34.

A blend of this product and equal parts by weight of pure cis-1,4-polybutadiene ("BUNA" CB 10) yielded, during the vulcanization and swelling tests, a $t_{90}$ value of less than 5 minutes, a reciprocal equilibrium swelling of 0.22, with 5.4% by weight of components soluble in p-xylene at 25° C. This proves the existence of a good covulcanization behavior.

The preceding examples can be repeated with similar success by subtituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for grafting a polydiene or a polyalkenamer onto an unsaturated polyolefin rubber backbone, which comprises:
   a. dispersing in a first liquid stream a catalytically effective amount of a first organic solvent-soluble Ziegler-Natta metathesis catalyst component containing a metal of Subgroups V thru VII of the periodic table;
   b. dispersing in a second liquid stream separate from said first liquid stream a catalytically effective amount of a second organic solvent-soluble Ziegler-Natta metathesis catalyst component containing an alkyl or a hydride of a metal from Main groups I thru III of the periodic table;
   c. dispersing, separately or as a mixture, into one or both of said first and second liquid streams or into at least one further liquid stream (i) a polydiene or a polyalkenamer having at least one metathesisable double bond per molecule and (ii) an unsaturated polyolefin rubber comprising a metathesisable copolymer of two or more α-olefins with an unconjugated diolefin; and
   d. intensively intermixing said liquid streams under metathesis reaction condictions to form in situ a catalytic amount of a complete Ziegler-Natta metathesis catalyst system and to metathetically graft said polydiene or polyalkenamer onto said polyolefin rubber, thereby reducing side reactions between the catalyst components and the polymer components of said streams; and
   e. recovering the resultant graft copolymer characterized by an increased reduced specific viscosity as compared to the starting polymer and a low gel content.

2. A process according to claim 1, wherein the reaction is conducted continuously.

3. A process according to claim 1, wherein the first and second metal-containing catalyst components are dissolved in separate identical partial streams each containing both said unsaturated polyolefin rubber and said polydiene or polyalkenamer.

4. A process according to claim 1, wherein one of the metal-containing components of the catalyst system is dissolved in a solution of the unsaturated polyolefin rubber, and the other metal-containing component of the catalyst system is dissolved in a solution of the polydiene or polyalkenamer.

5. A process according to claim 1, wherein one of the metal-containing components of the catalyst system is dissolved in a solution of a single polymer, and the other metal-containing component of the catalyst system is dissolved in a mixture of said polymer reactants.

6. A process according to claim 1, wherein one of the metal-containing components of the catalyst system is dissolved in a partial stream containing a solution mixture of said polymer reactants and the other metal-containing component of the catalyst system is dissolved in a solvent stream.

7. A process according to claim 1, further comprising admixing a Ziegler-Natta catalyst activator with one or more partial streams.

8. A process according to claim 1, wherein the unsaturated polyolefin rubber is an ethylene-propylene-unconjugated diene rubber.

9. A process according to claim 8, wherein the double bonds of the rubber are at least partially unsubstituted and are present either in an open chain or in a ring system which can be polymerized under ring opening.

10. A process according to claim 9, wherein the diene component of the rubber is dicyclopentadiene.

11. A process according to claim 9, wherein the diene component of the rubber is 1,4-hexadiene.

12. A process according to claim 1, wherein the polymer amenable to the metathesis reaction is a polyalkenamer.

13. A process according to claim 12, wherein the polyalkenamer is a polymer or oligomer of butadiene.

14. A process according to claim 13, wherein at least 90% of the double bonds of the butadiene are present as 1,4-vinylene groups.

15. A process according to claim 13, wherein more than 75% of the double bonds of the polybutadiene are present as cis-1,4 groups.

16. A process according to claim 12, wherein the polyalkenamer is polypentenamer.

17. A process according to claim 12, wherein the polyalkenamer is polyoctenamer.

18. A process according to claim 12, wherein the polyalkenamer is polydodecenamer.

* * * * *